Dec. 27, 1960   G. DUCKWORTH   2,966,677
LINEAR WAVEGUIDE TYPE ANTENNA ARRAY
Filed May 27, 1954
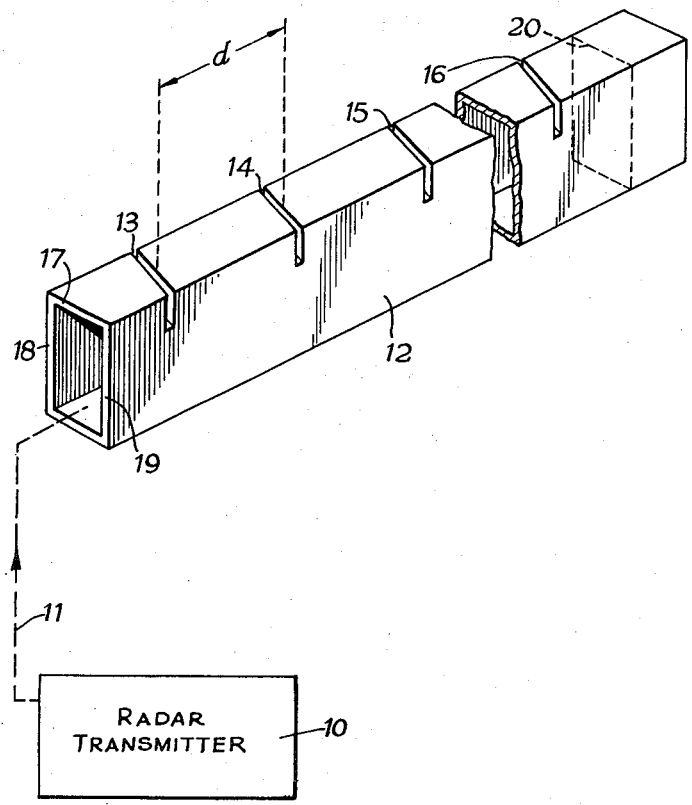
INVENTOR
GEORGE DUCKWORTH
BY
ATTORNEYS

2,966,677

LINEAR WAVEGUIDE TYPE ANTENNA ARRAY

George Duckworth, Barkingside, England, assignor to Kelvin & Hughes Limited, Hillington, Glasgow, Scotland Filed May 27, 1954, Ser. No. 432,796

Claims priority, application Great Britain June 11, 1953

1 Claim. (Cl. 343—771)

The present invention relates to aerial arrays known in the art as linear arrays, such arrays comprising a row of discrete radiators which, in operation, are energised in succession by electromagnetic waves travelling along a wave guide to which the radiators are coupled at points spaced along the wave guide. The discrete radiators may be dipoles in which case discrete couplings are provided between the dipoles and the wave guide. On the other hand the discrete radiators may be formed by slots cut in the wave guide in which case no discrete couplings need be provided. Examples of linear arrays are described in Section 6.4 of the textbook "Aerials for Centimetre Wave-lengths" by D. W. Fry and F. K. Goward published by Cambridge University Press, 1950, where arrays wherein the waves in successive slots are in phase are indicated as a "++ type array." As this terminology is used consistently in the textbooks on the subject, it is adopted here.

The arrangement of the discrete radiators in known linear arrays has been made such that the angle of squint is small. The angle of squint in an end-fire array is the angle between a line joining the radiators and the direction of the principal radiation, and in a broadside array is the angle between the normal to a line joining the discrete radiators and the direction of the principal radiation. Linear arrays hitherto proposed have not been suitable for providing principal radiation at large forward angles of squint without the disadvantage of accompanying undesired beams at other angles of squint and of substantial power.

One object of the present invention is to provide an improved linear aerial array suitable for providing principal radiation at large angles of squint.

A further object of the invention is to provide a linear aerial array such that principal radiation can be confined substantially to the surface or part of a single circular cone.

Linear aerial arrays can be grouped into two main classes namely ++ linear aerial arrays and +— linear aerial arrays. The present invention is concerned solely with ++ linear aerial arrays.

A ++ linear aerial array is a linear aerial array in which the arrangement of the discrete radiators and, where provided, the discrete coupling between the radiators and the wave guide, is such that if the spacing between the points at which the radiators are coupled to the wave guide were to be equal to $\lambda g$ the radiators would radiate in phase, $\lambda g$ being the wavelength in the wave guide of an electromagnetic wave fed to the radiators through the wave guide.

According to the present invention in a linear aerial of the ++ type using radiators in the form of slots, the spacing of the radiators is made less than $s$ where $s$ has a value such that the equation $1/s = 1/\lambda + 1/\lambda g$ is satisfied, $\lambda g$ being the wavelength in the wave guide of an electromagnetic wave fed to the radiators through the guide and $\lambda$ being the wavelength of the same wave in the space surrounding the guide, the arrangement being such that the value of the quotient $\lambda/\lambda g$ is substantially less than unity. It can be shown that a linear aerial array constructed in accordance with the present invention radiates at a forward angle of squint $\theta$ where $\sin \theta = \lambda/\lambda g$ and that principal radiation takes place at no other angle of squint. The beam radiated from the aerial array will of course have finite width and side lobe radiation will also be present. The beam width and the side lobe radiation need not be large however and are dependent upon the aperture of the array and the aperture illumination. It can also be shown that the angle $\theta$ is independent of the spacing of the radiators so long as the spacing is less than $s$. The value of the quotient $\lambda/\lambda g$ and thence the value of $\theta$ can be predetermined by suitably dimensioning the wave guide. A value of 0.71 for $\lambda/\lambda g$ and hence of approximately 45° for $\theta$ can readily be achieved.

In accordance with the present invention the wave guide is of rectangular cross-section and the discrete radiators are in the form of slots cut across one of the narrower walls of the wave guide and preferably extending partly across the two broader walls, the centre lines of the slots being inclined to the longitudinal edges of the wave guide and the sense of the inclination being the same for all slots.

The present invention provides structure which presents the following advantages:

(a) There is only one cone of principal radiation.

(b) The angle of this cone of principal radiation, known as the squint angle, is independent of the spacing of the slots in the wave guide. Because the squint angle is determined purely by the dimensions of the wave guide, great accuracy in the machining of the slots is not required with this novel structure.

One embodiment of the invention will now be described by way of example, with reference to the accompanying drawing which is a sketch illustrating the embodiment.

In the drawing, a radar transmitter 10 generating pulses of oscillations of a frequency of 9375 mc./s., is coupled by any suitable means shown schematically by a broken line 11 to a linear aerial array comprising a wave guide 12. The wave guide 12 is of the type known as WG16, has internal cross-sectional dimensions of 0.4" by 0.9", and has an air dielectric. Slots such as 13, 14, 15 and 16 are cut across one wall 17 of the wave guide, this wall being one of the two narrower walls, and extend partly across the two broader walls 18 and 19 of the wave guide. All of the slots are inclined to the longitudinal edges of the wave guide and it will be seen that the sense of inclination is the same for all slots whereby the array is one of the ++ type. A non-reflecting termination shown schematically by a broken line 20 is provided at the end of the wave guide 12 remote from the transmitter 10.

In the embodiment shown the value of the quotient $\lambda/\lambda g$ is about 0.71 and hence the angle of squint of the principal radiation is approximately 45°. The spacing $d$ of the slots in this embodiment must be made less than 1.8646 cms.

Although the slots are shown equally spaced it will be appreciated that so long as the spacing is less than 1.8646 cms. it may be non-uniform.

It will be understood that the degree of inclination of the individual slots may be varied to vary the degree of coupling between the wave guide and the slots.

In linear aerial arrays the angle of squint varies with change in the frequency of the waves radiated by the array. It can be shown that the variation of angle of squint with frequency may be less with an array according to the present invention than with known linear arrays.

Although reference has been made to arrays for use with transmitters it will be understood that arrays in accordance with the invention may also be used for receiving electromagnetic waves.

I claim:

A linear aerial array of the ++ type comprising a wave guide of rectangular cross-section and a plurality of radiators in the form of narrow slots cut in one of the narrower walls of said wave guide, and a source of electromagnetic waves coupled to said wave guide, wherein the spacing of said slots is less than $s$, where $s$ has a value satisfying the equation $1/s = 1/\lambda + 1/\lambda g$, $\lambda g$ being the wavelength in the wave guide of said electromagnetic waves and $\lambda$ being the wavelength of the same waves in the space surrounding the guide, wherein $\lambda/\lambda g$ is substantially less than unity and wherein the center lines of said slots are inclined with respect to the normal to the longitudinal edges of said wave guide, the sense of such inclination being the same for all the slots.

References Cited in the file of this patent

UNITED STATES PATENTS

| | | |
|---|---|---|
| 2,405,242 | Southworth | Aug. 6, 1946 |
| 2,573,746 | Watson et al. | Nov. 6, 1951 |
| 2,574,433 | Clapp | Nov. 6, 1951 |
| 2,597,144 | Clapp | May 20, 1952 |
| 2,730,717 | Katchky et al. | Jan. 10, 1956 |